(12) United States Patent
Chen

(10) Patent No.: US 7,223,125 B2
(45) Date of Patent: May 29, 2007

(54) ELECTRICAL CONNECTOR WITH RETAINING SHELL

(75) Inventor: Kun-Hua Chen, Tu-Cheng (TW)

(73) Assignee: Hon Hai Precision Ind. Co. Ltd, Taipei Hsien (TW)

(*) Notice: Subject to any disclaimer, the term of this patent is extended or adjusted under 35 U.S.C. 154(b) by 0 days.

(21) Appl. No.: 11/404,398

(22) Filed: Apr. 14, 2006

(65) Prior Publication Data

US 2006/0234557 A1    Oct. 19, 2006

(30) Foreign Application Priority Data

Apr. 14, 2005   (CN)   ................. 2005 2 0070823

(51) Int. Cl.
*H01R 13/648* (2006.01)
(52) U.S. Cl. ........................ 439/609; 439/68
(58) Field of Classification Search ................. 439/70, 439/71, 607, 68
See application file for complete search history.

(56) References Cited

U.S. PATENT DOCUMENTS

| | | | | | |
|---|---|---|---|---|---|
| 4,410,223 | A | * | 10/1983 | Baker | 439/81 |
| 5,073,116 | A | * | 12/1991 | Beck, Jr. | 439/71 |
| 5,236,367 | A | * | 8/1993 | McHugh et al. | 439/73 |
| 5,364,278 | A | * | 11/1994 | Laub | 439/69 |
| 5,588,847 | A | * | 12/1996 | Tate | 439/71 |
| 2003/0218873 | A1 | | 11/2003 | Nokia | |
| 2005/0239302 | A1 | * | 10/2005 | Wada | 439/71 |

* cited by examiner

*Primary Examiner*—James R. Harvey
*Assistant Examiner*—Travis Chambers
(74) *Attorney, Agent, or Firm*—Wei Te Chung

(57) ABSTRACT

An electrical connector (100) adapted for receiving a module body (4) comprises an insulative housing defining a cavity (10) for receiving the module body therein, a plurality of contacts (2) received in the insulative housing and a shielding shell (3). The shielding shell defines sidewalls (31,32) surrounding the housing and a pair of T-shaped resilient arms (33) extending upwards and towards the cavity from two opposite sidewalls. Each resilient arm has at least one pressing portion (333) extending downwards therefrom to press against the module body.

15 Claims, 5 Drawing Sheets

ELECTRICAL CONNECTOR WITH RETAINING SHELL

BACKGROUND OF THE INVENTION

1. Field of the Invention

The present invention relates to an electrical connector, and more particularly to an electrical connector adapted for receiving a module body such as a camera module.

2. Description of the Related Art

U.S. Patent Application Publication No. 2003/0218873 (Eromaki connector) discloses a conventional electrical connector for fastening a component such as camera module in an electronic device. The fastening structure includes a frame encasing the camera module and having one side substantially open to fit the camera module therein. As clearly shown in FIG. 3 and described in Paragraph of the Eromaki prior art, the disclosed fastening structure has a bottom and a plurality of flexible strips close to each other. Each strip is in form of a clasp-like tongue. Some of the strips are formed with hole like openings (Paragraph [0038]) for engaging with bulges on the component for retaining the component therein.

However, the fastening structure of the Eromaki connector is not firm because the flexible strip is easy to deflect, and thus the component is likely to drop out of the connector due to shock from outside, or the like. Moreover, the Eromaki connector can not achieve desired Electro-Magnet Interference (EMI) suppression because there are a plurality of slots between adjacent strips.

Hence, an improved electrical connector is desired to overcome the above problems.

BRIEF SUMMARY OF THE INVENTION

It is an object of the present invention to provide an electrical connector, which easily and securely receives a module body therein.

In order to obtain the objective above, an electrical connector adapted for receiving a module body comprises an insulative housing, a plurality of contacts received in the housing and a shielding shell. The insulative housing defines a cavity for receiving the module body therein. The shielding shell defines sidewalls surrounding the housing and a pair of T-shaped resilient arms extending upwards and towards the cavity from two opposite sidewalls. Each resilient arm has at least one pressing portion extending downwards therefrom to press against the module body.

Other objects, advantages and novel features of the invention will become more apparent from the following detailed description of the present embodiment when taken in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
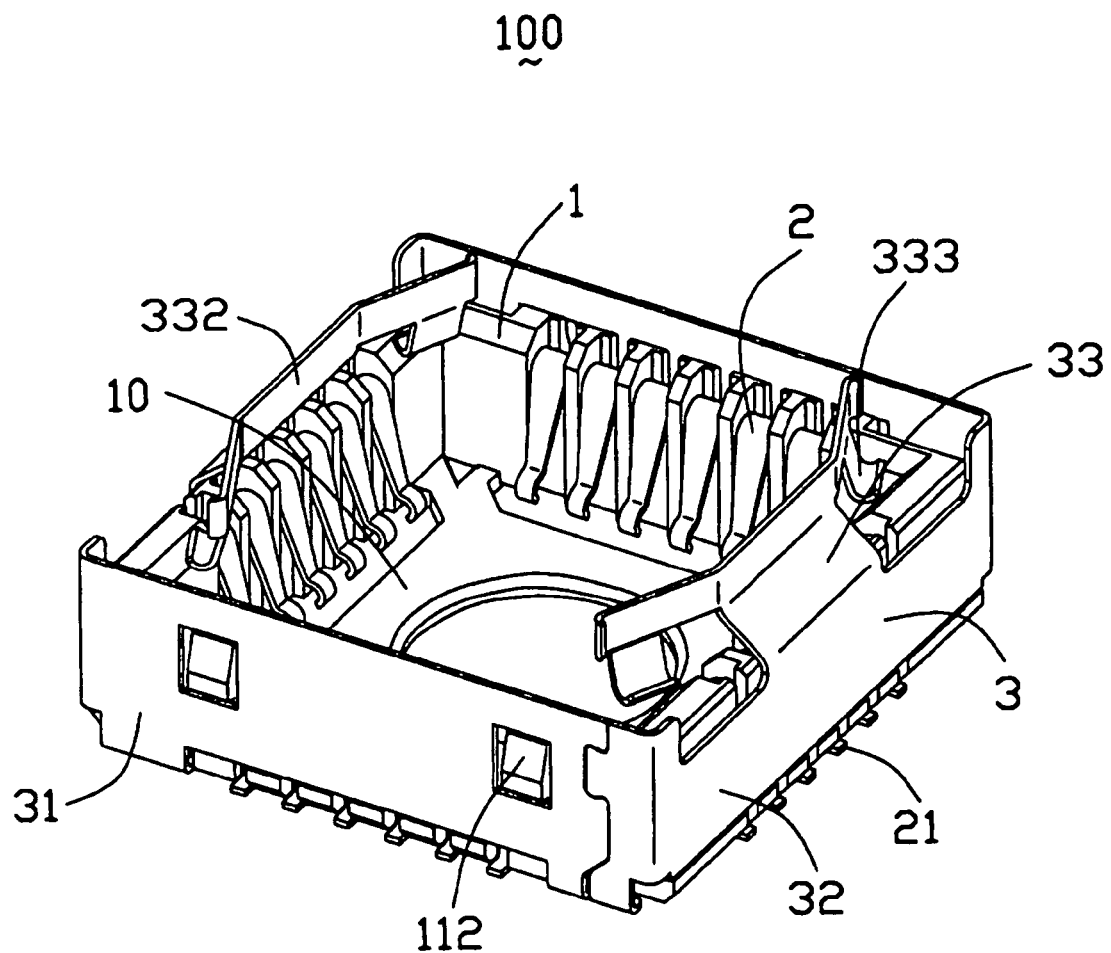
FIG. 1 is a perspective view of an electrical connector according to an embodiment of the present invention.
Figure 2:
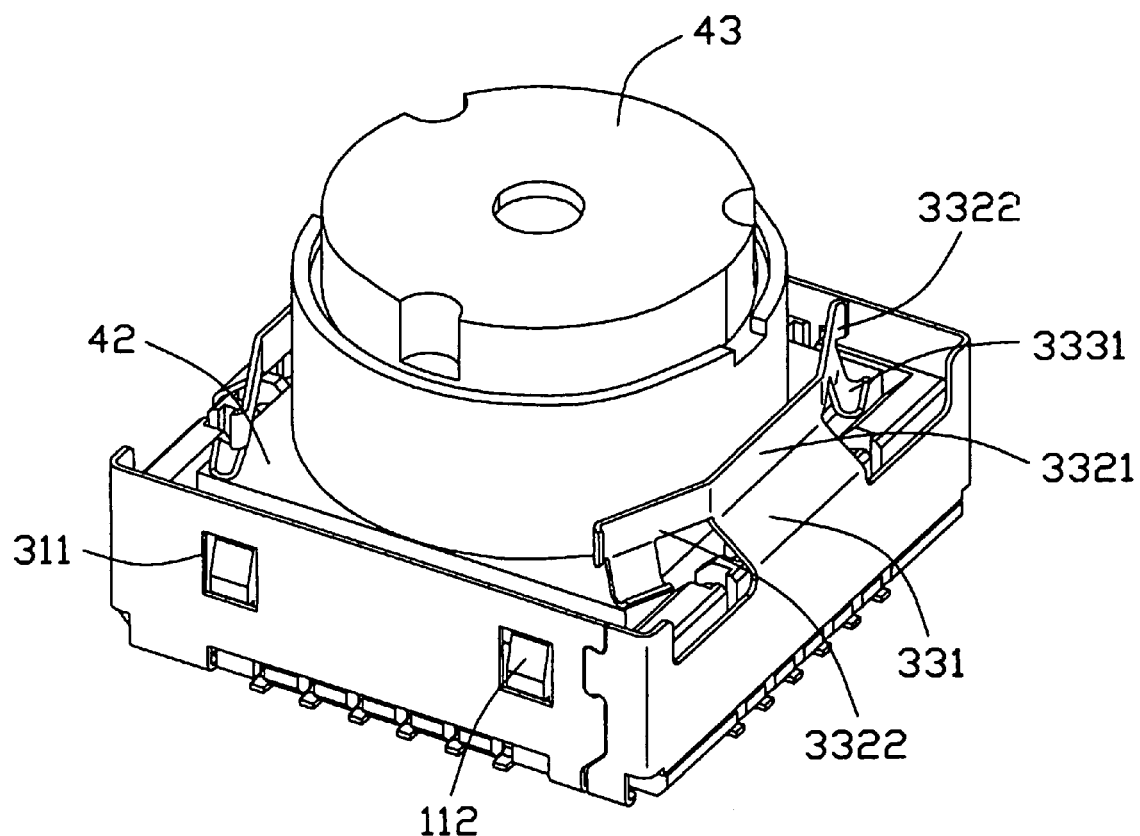
FIG. 2 is a perspective view of the electrical connector with a module body received therein.

In the following detailed description, for purposes of explanation, numerous specific details are set forth in order to provide a thorough understanding of the present invention. It will be apparent, however, that the present invention may be practiced without these specific details. In other instances, well-known structures and devices are schematically shown in order to simplify the drawing.

An electrical connector according to the present invention is applicable to electronic apparatuses such as digital cameras, PDAs (Personal Digital Assistances), PCs (Personal Computers), mobile telephones or the like. In the preferred embodiment illustrated in FIGS. 1–5, the electrical connector 100 is used in a mobile handset (not shown) for connecting a camera module 4 to an internal PCB (not shown).

Figure 3:
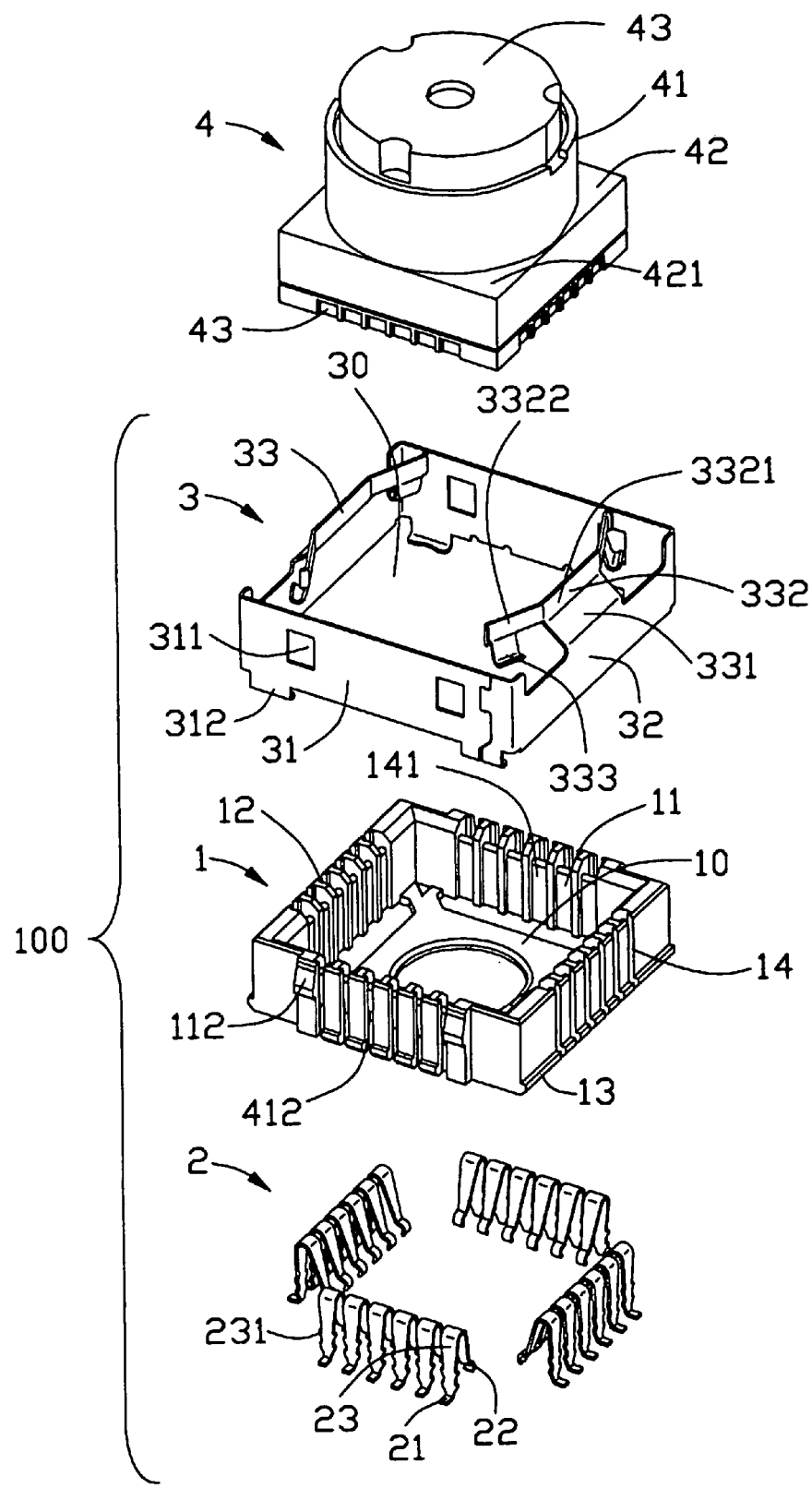
FIG. 3 is an exploded view of the electrical connector with the module body shown in FIG. 2.

Referring to FIGS. 1 and 3, the electrical connector 100 includes a housing 1 for receiving the camera module 4, a plurality of contacts 2 received in the housing 1, and a shielding shell 3 surrounding the housing 10, which not only prevents the connector from EMI but also retain the module body in the connector 100.

Figure 4:
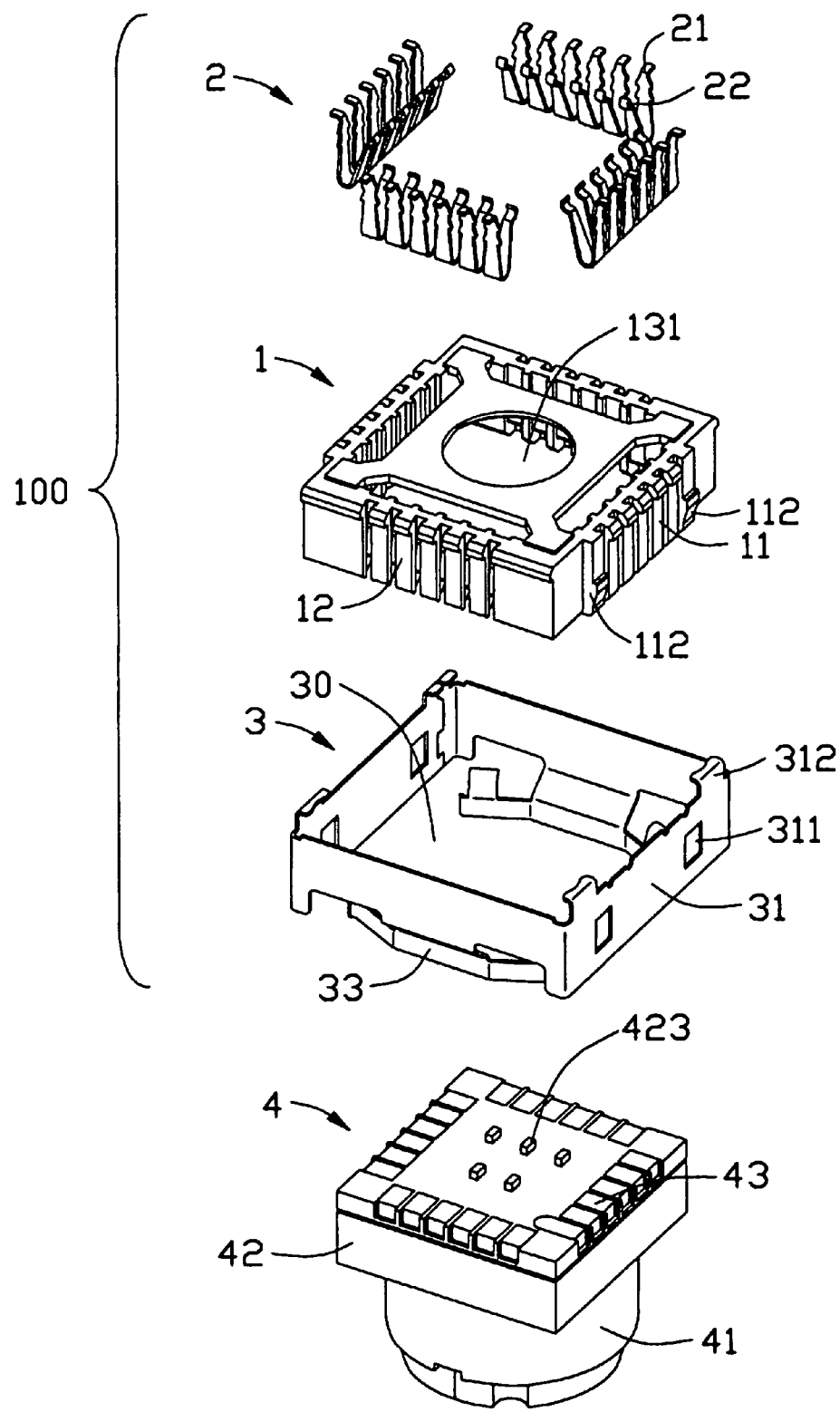
FIG. 4 is another exploded view of the electrical connector with the module body shown in FIG. 2 taken from a bottom aspect.
Figure 5:
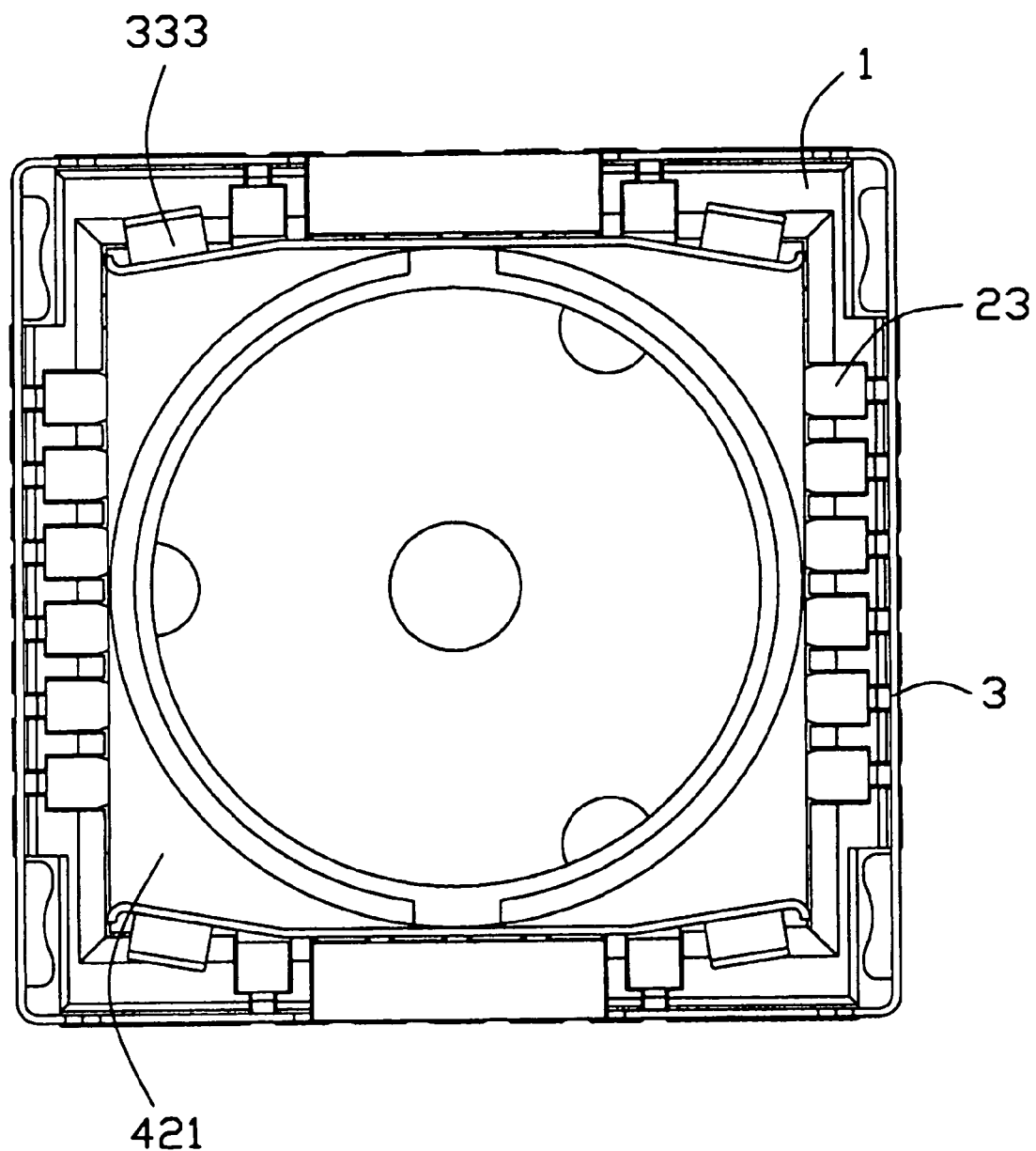
FIG. 5 is a top plan view of FIG. 2.

Referring to FIGS. 3–4, the housing 1 is molded from insulative material and is of squareness frame including two pairs of sidewalls, namely, front and rear walls 11, left and right walls 12 and a bottom wall 13 jointing said four sidewalls. Said five walls form a cavity 10 with upward open for receiving the camera module 4. Each sidewall defines a plurality of upright passageways 14 thereon, each of which includes an inner portion 141 along the inner side and a corresponding outer portion 142 along the outer side. The front and rear walls 11 each has two protrusions 112 respectively on two sides therehof.

Each contact 2 has an inverted-V-shaped base portion 23 retained in the passageways 14, with an inner section received in the inner portion 141 of the passageway and an outer section having barbs 231 retained in the outer portion 142 of the passageways. Each contact portion 2 further has a contact potion 22 with cam shape on the distal end of the inner section, which slantways extends into the cavity 10, best shown in FIG. 1, and a solder portion 21 extending laterally from the outer section of base portion 23 for being soldered on the PCB.

Still referring to FIGS. 3–4, the shielding shell 3 is made of metal material, and is of squareness frame including four sidewalls, namely front and rear walls 31, left and right walls 32. The left and right walls 32 respectively define a T-shaped arm 33 extending upwards therefrom. The front and rear walls 31 respectively define two through slots 311 thereon and two legs 312. The shell 3 tightly encases the housing 1 by the through slots 311 engaged with the protrusions 112, best shown in FIG. 1.

Best shown in FIGS. 1 and 3, the front and rear sidewalls 31 of the shell 3 vertically rise beyond the tops of corresponding sidewalls of the housing somewhat. Contrarily, the left and right sidewalls 32 stand lower than corresponding sidewalls of the housing, with its top edges located vertically below corresponding top edges of the sidewalls. A connecting portion 331 extends from the middle portion of the top edge of the sidewall 32 and slants inwards. A resilient portion 332 upright extends from another end of the connecting portion 331 opposite said end connected to the sidewall 32. The resilient portion 332 consists of a central portion 3321 parallel to the sidewall 32 and two end portions 3322 curved inwards at opposite ends of the central portion 3321 for forming an embrace shape. Each end portion 3332 defines a pressing portion 333 extending downward from its bottom edge, close to the distal end thereof. The pressing portion 333 defines an arc-shaped distal end. The connecting portion 331 is approximately ⅓ width of the wall 32 in the front and back direction, and the width of the resilient portion 332 in the front and back direction approximately equals to that of the sidewall 32, to increase resiliency of the resilient arm 33.

Still referring to FIGS. 3–4, the camera module 4 includes a lower base portion 42 according to the cavity 10 and a hollow column portion 41 above the base portion. A lens 43 is disposed in the hollow column portion 41. A plurality of conductive pads 43 is disposed on lower sidewalls of the base portion 42. A plurality of projections 423 is defined on the bottom side of the base portion 42, which can align with the circular hole 131 on the bottom wall 13 of the housing 1 to assemble the camera body in the housing.

In usage, the connector 100 is mounted on the PCB by soldering the contacts 2 and legs 312 to traces on the PCB. In assembling process of the camera module 4 to the connector 100, the T-shaped arms 33 are deflected outwards by a tool (not shown) firstly, and then the base portion 42 of the camera module 4 is inserted into the cavity 10 until the conductive pad 43 of the camera module 4 engages with the contact portion 22 of the connector for establishing an electrical connection therebetween. Last, remove the tool to make the T-shaped arms 32 resile to have the central portions 3321 thereof resiliently pressing against the outer surface of the hollow column portion 41 and four pressing portions 333 thereof press against the top surface 421 of lower base portion 42 diagonally, best shown as FIG. 5. The pressing portions can prevent the camera module 4 from moving in the shell, and they also can extend from top edges of the end portions 3322.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. An electrical connector adapted for receiving a module body, comprising:
    an insulative housing defining a cavity for receiving the module body therein;
    a plurality of contacts received in the insulative housing;
    a shielding shell defining sidewalls surrounding the insulative housing and a pair of resilient arms extending upwards and towards the cavity from the middle of the top edge of two opposite sidewalls, each resilient arm having at least one pressing portion extending downwards from the end of the resilient arm to press against the module body.

2. The electrical connector according to claim 1, wherein the pressing portions are disposed diagonally.

3. The electrical connector according to claim 1, wherein the resilient arms are of T-shaped configuration and each defines a connecting portion inwards extending from the sidewall and a resilient portion extending from the connecting portion.

4. The electrical connector according to claim 3, wherein the resilient portion is upright to define a central portion and two end portions disposed on the opposite ends of the central portion, and the pressing portions extend downward from lower edges of the end portions.

5. The electrical connector according to claim 1, wherein the pressing portion defines an arc-shaped distal end.

6. The electrical connector according to claim 3, wherein the width of the connecting portion is approximate ⅓ to that of the sidewall of the shell, and the width of the resilient portion equals to that of the sidewall of the shell.

7. The electrical connector according to claim 1, wherein the shielding shell comprises four sidewalls, two opposite sidewalls having a pair of resilient arms vertically rise below top edges of corresponding sidewalls of the housing.

8. The electrical connector according to claim 1, wherein the shielding shell has legs extending from lower edges of the sidewalls of the shell.

9. The electrical connector according to claim 1, wherein the insulative housing has protrusions on its sidewalls, and the shielding shell has through slots to be retained with the protrusions of the insulative housing.

10. An electrical connector for electrically connecting a module body to a printed circuit board (PCB), the module body comprising a lower base portion with a plurality of conductive pads thereon and a column portion above the base potion, the electrical connector comprising:
    an insulative housing defining an upper cavity dimensioned to receive the lower base portion of the module body;
    a plurality of contacts received in the insulative housing, each contact having a base portion secured in the housing, a contact portion extending into the cavity of the housing for electrically engaging with corresponding conductive pads of the module body and a soldering portion electrically engaging with the PCB;
    a shielding shell surrounding an outer side of the insulative housing, comprising a pair of opposite T-shaped resilient arms deflectably embracing an outer surface of the column portion and pressing portions pressing against an upper surface of the lower base portion of the module body diagonally.

11. The electrical connector according to claim 10, wherein the T-shaped resilient portions slants toward each other and the pressing portions downwards extend from the resilient portion.

12. The electrical connector according to claim 11, wherein the insulative housing defines a circular hole and the base portion of the module body defines a plurality of projections on its bottom side to align with the circular hole.

13. An electrical connector assembly comprising:
    an insulative housing defining an upward cavity;
    a module body received in said cavity;
    a plurality of contacts received in the insulative housing with contacting portions extending into the cavity;
    a shielding shell defining sidewalls surrounding the insulative housing and at least a resilient arm extending from the corresponding side wall and over a top edge of the insulative housing and towards the cavity having at least one pressing portion downwards pressing against the module body, wherein said resilient arm includes a resilient upward extension section connected to the corresponding side wall, and a resilient sideward extension section connected to said resilient upward extension section, under a condition that said at least one pressing portion is connected to said resilient sideward extension section and thus owns resiliency in both vertical and horizontal directions with regard to the module body.

14. The assembly as claimed in claim 13, wherein said resilient arm defines a generally arc-like configuration, from a top view of the insulative housing, to comply with a columnar section of the module body.

15. The assembly as claimed in claim 13, wherein said pressing portion extends downwardly with a distance.

* * * * *